3,111,523
GLUTARIMIDE COMPOUNDS AND METHODS FOR THEIR PRODUCTION
Roger P. Frohardt and Henry W. Dion, Royal Oak, and John Ehrlich, Grosse Pointe Park, Mich., assignors to Parke, Davis & Company, Detroit, Mich., a corporation of Michigan
No Drawing. Filed May 13, 1960, Ser. No. 28,834
5 Claims. (Cl. 260—281)

This invention relates to new chemical compounds and to methods for producing the same. More particularly, the invention relates to certain glutarimide compounds and to methods for producing the same.

The glutarimide compounds with which the invention is concerned have the formula, $$R-\overset{O}{\overset{\|}{C}}-CH_2-\overset{R_1}{\overset{|}{C}H}-CH_2-\overset{O}{\overset{|}{C}H}\overset{CH_2-\overset{O}{\overset{\|}{C}}}{\underset{CH_2-\overset{\|}{C}}{\diagdown}}NH$$

d-optical form where R is a group having the formula:

$$CH_2=CH-\overset{CH_3}{\overset{|}{C}}=CH-\overset{CH_3}{\overset{|}{C}H}-$$

$$C_2H_5\overset{CH_3}{\overset{|}{C}}=CH-\overset{CH_3}{\overset{|}{C}H}-$$

or $$C_2H_5-\overset{CH_3}{\overset{|}{C}H}-CH_2-\overset{CH_3}{\overset{|}{C}H}-$$

and $R_1$ represents hydrogen or a lower alkanoyl radical.

The compounds of the invention are, as indicated above, optically active. For the sake of simplicity and clarity they have been designated as having the d-optical form on the basis of the optical rotation of the compound wherein R is a $$CH_2=CH-\overset{CH_3}{\overset{|}{C}}=CH-\overset{CH_3}{\overset{|}{C}H}-$$

group and $R_1$ is hydrogen which has an optical rotation of $[\alpha]_D^{28}=+238°$ (c.=0.5% in water). The term "d-optical form" or "d" as used herein therefore is to be understood to mean substances having the same optical configuration at the asymmetric carbon atom in the above formula as the aforementioned specific compound.

The products of the invention are useful in combating the growth of undesirable plant species, particularly as pre-emergence herbicides. For this purpose a dilute aqueous solution is employed and the solution applied to the soil, as by spraying, prior to the emergence of the plants. Such solutions are also useful for application along railroads and for other applications when plant growth is to be avoided. For example, the substance wherein R is a $$CH_2=CH-\overset{CH_3}{\overset{|}{C}}=CH-\overset{CH_3}{\overset{|}{C}H}-$$

group and $R_1$ is hydrogen (hereinafter called "streptimidone" for convenience) in a concentration of 0.5 pound per 100 gallons of water is highly effective as a pre-emergence herbicide, when applied by spraying at the rate of 20 pounds per acre, in completely preventing the growth of crab grass, morning glory and German millet. A single application of the spray to the soil under treatment is ordinarily all that is required.

In accordance with the invention streptimidone, d-3-(2-hydroxy-5,7-dimethyl-4-oxo-6,8-nonadienyl) glutarimide, can be produced by extracting an aqueous culture medium filtrate of *Streptomyces rimosus* forma *paromomycinus* from which the paromomycin has been removed or an aqueous culture medium filtrate of *Streptomyces rimosus* forma *paromomycinus* with an organic solvent in which streptimidone is very soluble. The extraction is preferably carried out in a slightly acid environment, although this is not necessary. As extraction solvents alkyl esters of lower fatty acids such as ethyl acetate, butyl acetate, amyl acetate and ethyl propionate, water immiscible ketones such as methyl isobutyl ketone, aliphatic alcohols such as n-butanol and n-amyl alcohol, chlorinated methanes such as chloroform and aromatic hydrocarbons such as benzene and toluene can be used.

The aqueous culture medium filtrates used as starting materials can be produced as described in Belgian Patent No. 547,976. A culture of *Streptomyces rimosus* forma *paromomycinus* as described therein is being permanently maintained in the culture collection of the Northern Utilization Research & Development Division, U.S. Department of Agriculture, Peoria, Illinois, as NRRL 2455.

The crude streptimidone obtained from the extract either by precipitation with an organic solvent in which streptimidone is not soluble such as petroleum ether or by evaporation of the solvent can be used as a herbicide as described above or it can be purified in various ways. For example, it can be dissolved in an organic solvent such as acetone or ethyl acetate, the solution chromatographed over activated carbon, the eluate concentrated and the streptimidone crystallized from the concentrate. Alternatively, it can be dissolved in water, the solution subjected to countercurrent extraction with an organic solvent such as ethyl acetate or n-butanol and the streptimidone rich fractions concentrated to the point of crystallization. Still another method of purification consists in dissolving the crude product in an excess of a crystallization solvent for streptimidone, charcoaling the solution, washing the solution with water and concentrating the organic phase to the point of crystallization.

Dihydrostreptimidone and tetrahydrostreptimidone, that is, the products wherein $R_1$ is hydrogen and R is a $$C_2H_5\overset{CH_3}{\overset{|}{C}}=CH-\overset{CH_3}{\overset{|}{C}H}-$$

or $$C_2H_5\overset{CH_3}{\overset{|}{C}H}-CH_2-\overset{CH_3}{\overset{|}{C}H}-$$

group, can be produced by catalytic reduction of streptimidone using gaseous hydrogen. High hydrogen pressures are not necessary because the reaction proceeds quite rapidly at room temperature using hydrogen at atmospheric pressure or slightly above. As solvents for the reduction lower aliphatic alcohols are preferred; specifically, methanol and ethanol. As hydrogenation catalysts palladium on calcium carbonate is used for the production of dihydrostreptimidone and palladium on carbon for the production of tetrahydrostreptimidone. When using these catalysts with the preferred solvents the respective reactions stop after the desired two or four hydrogens have been introduced into the streptimidone molecule.

The substances wherein $R_1$ is a lower fatty acid acyl group are produced by reaction of streptimidone, dihydrostreptimidone or tetrahydrostreptimidone, respectively, with an acylating agent under conditions capable of esterifying secondary hydroxyl groups. From the standpoint of economy and ease of operation the acyl anhydrides are the preferred acylating agents. These agents are preferably employed under anhydrous conditions in the presence of a basic catalyst such as pyridine.

This application is a continuation-in-part of our co-pending application Serial No. 764,749, filed October 2, 1958, and now abandoned.

The invention is illustrated by the following examples:

*Example 1*

3670 liters of a culture medium filtrate of *Streptomyces rimosus* forma *paromomycinus* from which the paromomycin had been removed and which assayed 1328 micrograms of streptimidone per milliliter against *Kloeckera africana* was extracted with ethyl acetate in a countercurrent extractor at a solvent-to-beer ratio of 1 to 4. The aqueous phase was discarded and the organic phase concentrated to a volume of 102 liters. 3.785 liters of this ethyl acetate concentrate was evaporated to dryness in vacuo to obtain 133 g. of crude streptimidone. The residue was dissolved in 650 ml. of acetone and then 650 ml. of water and 600 ml. of petroleum ether added to the solution. After shaking, the aqueous layer was separated and subjected to countercurrent extraction using five 4-liter separatory funnels. The aqueous layer was placed in the first funnel and shaken with a mixture composed of 250 ml. of water, 250 ml. of acetone and 1.75 liters of isopropyl ether. The aqueous phase was separated and transferred successively to the second, third, fourth and fifth funnels which each contained 2.2 liters of the organic phase of a mixture composed of 4.35 liters of water, 2.4 liters of acetone and 19.8 liters of isopropyl ether. Fresh aqueous phase was added to the first funnel in a 1.2 liter portion. The organic phases from the second, third and fourth funnels were combined and evaporated in vacuo to the point of crystallization. On standing and cooling 7.9 g. of crystalline streptimidone were obtained. The product upon recrystallization from 90% isopropyl ether–10% acetone solution melted at 72–3° C.; $[\alpha]_D^{28} = +238$ (0.5% in water); $[\alpha]_D^{27} = +245°$ (0.5% in chloroform). The product has the formula,

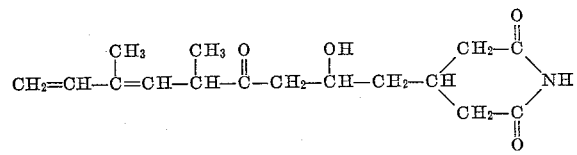

$d = optical\ form$

The starting material used in the above procedure was prepared as follows:

A 10 liter portion of a nutrient medium having the following composition:

| | Percent |
|---|---|
| Glucose monohydrate | 2.0 |
| Soybean oil meal | 1.0 |
| Hog stomach residue, saline extracted | 0.5 |
| Ammonium chloride | 0.167 |
| Sodium chloride | 0.5 |
| Calcium carbonate | 0.5 |
| Water, sufficient to make | 100.0 |

Was adjusted to pH 7.5 with 10 N sodium hydroxide solution and placed in a 30-liter fermentor equipped with stainless steel fittings including sparger, impeller, baffles and sampling lines and the medium sterilized by heating at 121° C. for two hours. The post-sterilization pH was 7.3. The medium was cooled and inoculated with 20 ml. of a suspension of the spores from two Meyer's sporulation agar slant cultures of *Streptomyces rimosus* forma *paromomycinus* in sterile 0.1% sodium heptadecyl sulfate solution. The inoculated culture mixture was incubated at 26° C. for seventy-one hours during which time the mixture was stirred at 225 r.p.m. and sterile air was passed into the medium through the sparger at the rate of 12 liters per minute. Crude lard and mineral oils containing mono- and di-glycerides were added as needed during the incubation to avoid foaming. The resulting incubated culture mixture was employed for inoculation of a second nutrient medium as described in the following paragraph.

A 37.8 liter portion of nutrient medium having the composition described above was placed in a 113 liter stainless steel fermentor and sterilized for sixty minutes at 121° C. The post-sterilization pH was 6.90. The medium was cooled and inoculated with 200 ml. of the incubated culture mixture prepared as described in the preceding paragraph and the inoculated culture mixture incubated at 26° C. for twenty-four hours, during which time the mixture was stirred and sterile air passed into the medium at the rate of 6.5 cubic feet per minute. Foaming was avoided during the incubation by the addition, as needed, of crude lard and mineral oils containing mono- and di-glycerides. The resulting incubated culture mixture was employed for the inoculation of a third culture medium as described below.

A 1135.5 liter portion of nutrient medium having the composition described above was placed in a 1892 liter stainless steel fermentor and sterilized by heating at 121° C. for one hour. The post-sterilization pH is 6.75. The culture medium was cooled and inoculated with a 37.8 liter portion of the incubated culture mixture prepared as described in the preceding paragraph. The inoculated culture mixture was incubated for twenty-four hours at 26° C. during which time the mixture was stirred at 84 r.p.m. and aeration was supplied at the rate of 45 cubic feet per minute. Foaming was avoided by incorporating 3 liters of crude lard and mineral oils containing mono- and di-glycerides in the culture medium prior to incubation and by further addition of lard and mineral oils as required. A portion of the resulting incubated culture mixture was employed for the inoculating of a still further nutrient medium as described hereinafter.

4542 liters of nutrient medium having the composition described above were placed in a 7570 liter stainless steel fermentor and sterilized at 121° C. for one hour. The post-sterilization pH was 6.70. The medium was allowed to cool and inoculated with 567.75 liters of the incubated culture mixture obtained as described in the preceding paragraph. The inoculated culture mixture was incubated for three days at 26° C. during which time the mixture was stirred at 125 r.p.m. and sterile air passed into the medium at the rate of 120 cubic feet per minute. Foaming is avoided by the addition of 10 liters of lard and mineral oil anti-foam agent prior to incubation and by further addition of 12 liters of the agent as required during incubation. After seventy-two hours of incubation a 3500 liter portion of the incubated culture mixture was removed and adjusted to pH 2 by the addition of 29.4 kilograms of concentrated sulfuric acid. 84 kilograms of diatomaceous earth were added and mixed to form a slurry and the resulting mixture filtered through a 36-inch plate-and-frame filter press precoated with 22.6 kilograms of diatomaceous earth.

The combined filtrate and wash having a volume of 4100 liters was adjusted to pH 7.15 by addition of 56.9 liters of 6 N sodium hydroxide solution and passed through a column of 92.5 liters of 16–50 mesh carboxylic acid resin in the ammonium form (Amberlite IRC–50) to remove the paromomycin present in the solution. The percolate containing the streptimidone was concentrated to 530 liters at a temperature not exceeding 35° C. The concentrated percolate was combined with 2760 liters of a similar concentrate obtained by the like process as described hereinbefore. Eight pounds of diatomaceous earth were added to 3300 liters of the combined concentrated percolate and the mixture filtered through an eighteen-inch frame-and-plate filter press precoated with four pounds of diatomaceous earth. The filter was washed with water and the washings added to the main filtrate. The resulting solution (volume 3670 liters) was used as the starting material in the above example.

*Example 2*

3406 liters of a culture medium filtrate of *Streptomyces rimosus* forma *paromomycinus* from which the paromomycin had been removed (prepared by the method set forth in Example 1) was extracted with 853 liters of ethyl acetate in a Podbielniak countercurrent extractor and the aqueous phase discarded. The ethyl acetate extract was concentrated to a volume of 13.25 liters and 3.5 liters of it passed through a six inch adsorption column prepared from a slurry of 2.5 kg. of activated carbon and 2.5 kg. of diatomaceous earth in ethyl acetate. The column was developed with ethyl acetate while maintaining a flow rate of 3 to 3.5 liters per hour. After about one hold-up volume (about 14 liters) streptimidone appears in the eluate. The next seven liters of eluate was collected and the ethyl acetate solution concentrated to a streptimidone concentration of about 142 milligrams per milliliter. Sufficient isopropyl ether (about 2 to 3 volumes) to produce a slightly turbid solution was added, the solution filtered and the filter washed with 200 ml. of isopropyl ether-ethyl acetate mixture. Sufficient isopropyl ether was added to the combined filtrate and wash solution to produce an isopropyl ether-ethyl acetate ratio of 3.5 to 1 and the solution cooled at 8° C. for twenty-four hours. The crystalline streptimidone was collected, washed with isopropyl ether-ethyl acetate mixture and dried in vacuo; M.P. 72–3° C.; $[\alpha]_D^{28} = +238°$ (0.5% in water).

*Example 3*

Thirty-six liters of a culture medium filtrate of *Streptomyces rimosus* forma *paromomycinus* from which the paromomycin had been removed (prepared by the method set forth in Example 1) was extracted with 4.5 liters of ethyl acetate in a countercurrent extractor, and the extract concentrated to a volume of 500 ml. The extract (assay 85.2 mg./ml. against *K. africana*) was washed four times with 50 ml. portions of 1 molar sodium carbonate solution, four times with 50 ml. portions of 0.1 N hydrochloric acid and three times with 50 ml. portions of water. The washed ethyl acetate solution was concentrated to a volume of 138 ml. and the concentrate poured into 1240 ml. of petroleum ether. The mixture was allowed to stand overnight at 5° C., the solvent removed by decantation and the residue dissolved in sufficient acetone to give 120 ml. of solution.

A 100 ml. portion of the acetone solution containing the desired streptimidone was diluted with 100 ml. of acetone and 750 ml. of isopropyl ether. One gram of activated charcoal was added, the mixture stirred for about one-half hour and the charcoal removed by filtration. The filter was washed with a mixture consisting of 135 ml. of isopropyl ether and 45 ml. of acetone and the washings added to the main filtrate. To this solution was added with stirring a mixture consisting of 500 ml. of isopropyl ether, 500 ml. of water and 50 ml. of acetone. The two phases were separated. The organic phase was retained and the aqueous phase extracted twice with a mixture composed of 1 liter of isopropyl ether and 200 ml. of acetone. The organic phases were combined with the original organic phase to give a solution having a volume of 3825 ml. and containing 6 mg./ml. of streptimidone. The solution was washed with 300 ml. of water, the aqueous phase discarded and the organic phase cooled to −20° C. to freeze out traces of water. The mixture was filtered and the filtrate concentrated in vacuo until the solution became cloudy. The solution was warmed, seeded, allowed to stand overnight at 5° C. and the crystalline streptimidone collected by filtration; M.P. 72–3° C.

If desired, n-butanol, chloroform or methyl isobutyl ketone can be used for the extraction of the culture medium filtrate in the above procedure. In such a case the extract is concentrated to dryness in vacuo, the residual crude streptimidone taken up in ethyl acetate and the resulting solution treated as described above.

If desired, the culture medium filtrate used in the above procedure can be replaced with a culture medium filtrate of *Stretptomyces rimosus* forma *paromomycinus* from which the paromomycin has not been removed. To increase stability the culture medium filtrate can be slightly acidified, prior to applying the above procedure.

*Example 4*

25 g. of streptimidone was dissolved in 200 ml. of 95% ethanol and 2.5 g. of 5% palladium on calcium carbonate catalyst added to the solution. The resulting mixture was subjected to catalytic hydrogenation at room temperature using gaseous hydrogen at a pressure of 20 lbs. per sq. in. After 1.05 moles of hydrogen had been absorbed the reaction stopped. The catalyst was removed by filtration and the ethanol removed in vacuo from the filtrate. The dihydrostreptimidone [*d*-3-(2-hydroxy-5,7-dimethyl-4-oxo-6-nonenyl)glutarimide] so obtained was purified by recrystallization from isopropyl ether-methanol solution; M.P. 47–9° C.; $[\alpha]_D^{26} = +80°$ (c.=5% in methanol). The formula of the product is:

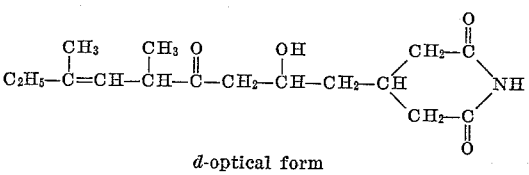

*d*-optical form

*Example 5*

998 mg. of streptimidone was dissolved in 25 ml. of 95% ethanol, 200 mg. of palladium on charcoal catalyst added to the solution and the mixture reduced catalytically at room temperature using gaseous hydrogen at atmospheric pressure. Hydrogen absorption was complete after three hours. The catalyst was removed by filtration, the solvent removed from the filtrate in vacuo to obtain the desired tetrahydrostreptimidone [*d*-3-(2-hydroxy-5,7-dimethyl-4-oxynonyl)glutarimide.] The product was purified by recrystallization from isopropyl ether; M.P. 56.5–57° C.; $[\alpha]_D^{28} = +11°$ (c.=5% in ethanol). The formula of the product is:

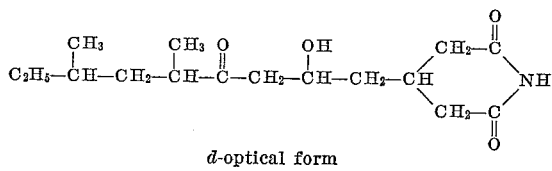

*d*-optical form

*Example 6*

A mixture consisting of 968 mg. of streptimidone, 5 ml. of acetic anhydride and 5 ml. of pyridine was allowed to stand at room temperature for seventy hours. The mixture was evaporated to dryness in vacuo and the residual oil crystallized from a solution of isopropyl ether and acetone to obtain the desired *d*-3-(2-acetoxy-5,7-dimethyl-4-oxo-6,8-nonadienyl)glutarimide; M.P. 108–110° C.; $[\alpha]_D^{27} = +232°$ (c.=0.5% in methanol). The formula of the product is:

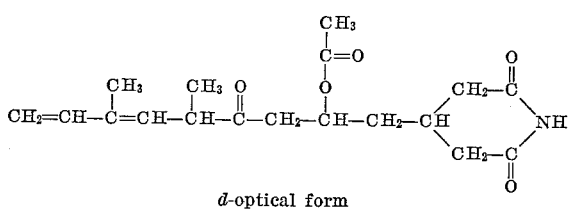

*d*-optical form

*Example 7*

A mixture consisting of 1 g. of tetrahydrostreptimidone, 5 ml. of acetic anhydride and 5 ml. of pyridine was allowed to stand at room temperature for several days. The reaction mixture was evaporated to dryness in vacuo and the residual *d*-3-(2-acetoxy-5,7-dimethyl-4-oxononyl)-glutarimide purified by recrystallization from isopropyl ether-acetone mixture; M.P. 86.5–87° C.; $[\alpha]_D^{28} = +12°$ (c.=5% in ethanol). The formula of this product is,

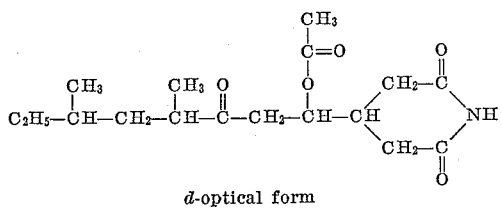

*d*-optical form

If desired, dihydrostreptimidone can be used in the above procedure to produce the corresponding acetoxy compound. Similarly, the acetic anhydride can be replaced with other fatty acid anhydrides such as propionic anhydride.

We claim:
1. *d* - 3 - (2 - hydroxy - 5,7 - dimethyl - 4 - oxo - 6-nonenyl)glutarimide.
2. *d* - 3 - (2 - hydroxy - 5,7 - dimethyl - 4 - oxononyl)glutarimide.
3. *d* - 3 - (2 - acetoxy - 5,7 - dimethyl - 4 - oxo - 6,8-nonadienyl)glutarimide.
4. *d* - 3 - (2 - acetoxy - 5,7 - dimethyl - 4 - oxononyl)glutarimide.
5. A compound of the formula

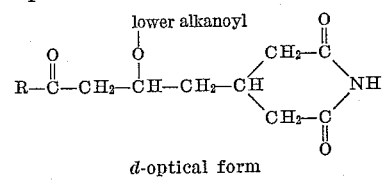

*d*-optical form where R is a member of the class consisting of

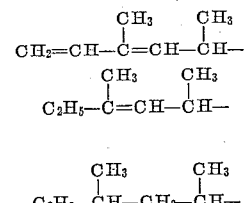

and

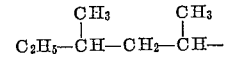

References Cited in the file of this patent

Frohardt et al.: Jour. Am. Chem. Soc., volume 81, pages 5500–5506 (1959).

Recueil des Brevets d'Invention, Belgium, January-June 1956, abstract Patent No. 547,976, pages 879-880.